Nov. 8, 1966 F. ISCHINGER ETAL 3,283,800
WHEEL FOR PNEUMATIC TIRES
Filed Feb. 23, 1965
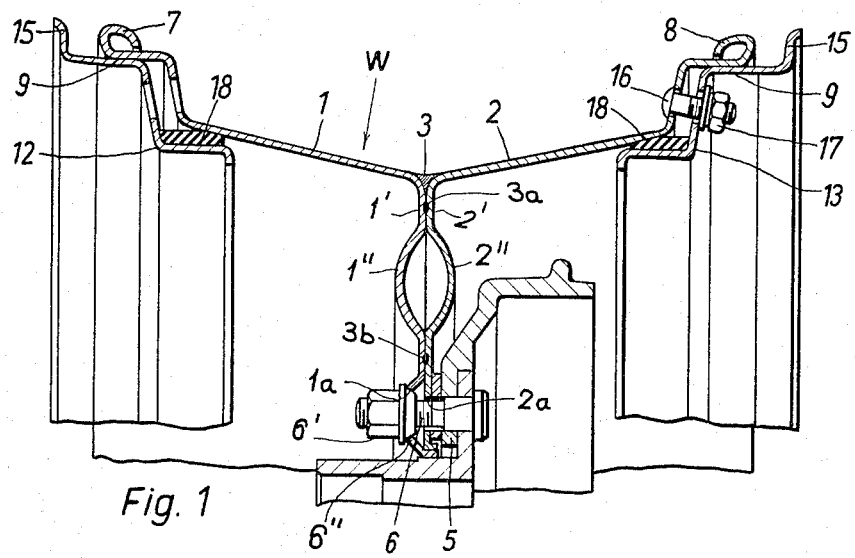
Fig. 1
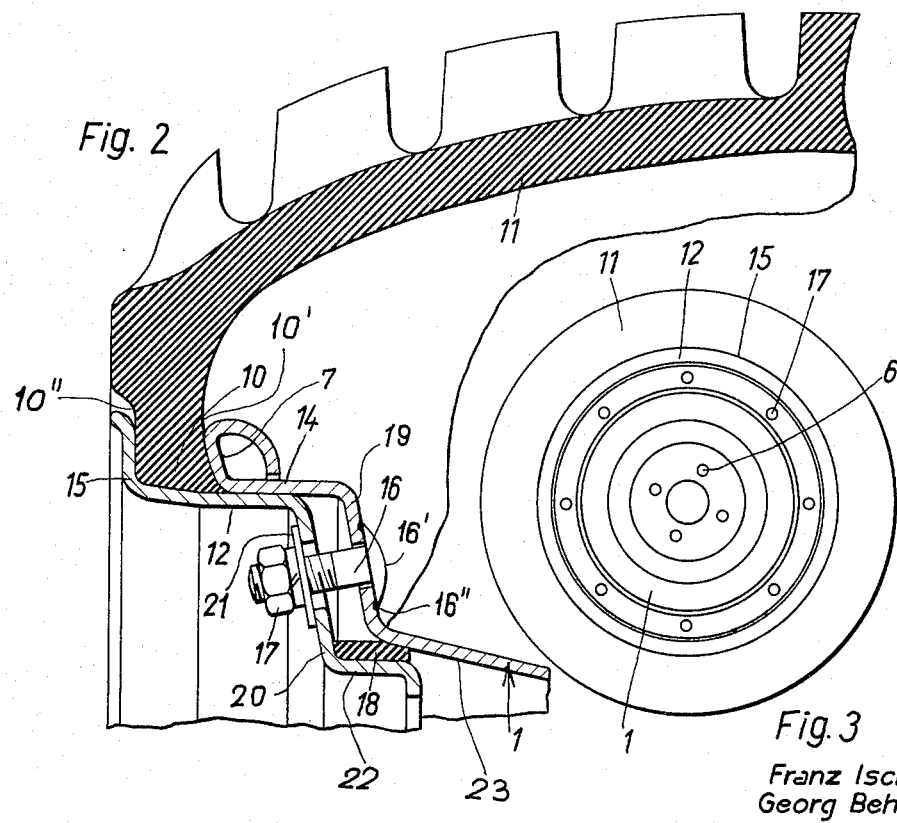
Fig. 2
Fig. 3
Franz Ischinger
Georg Behrmann
Karl Linzenkirchner
INVENTORS.
BY Karl F. Ross
Attorney United States Patent Office 3,283,800
Patented Nov. 8, 1966

3,283,800
WHEEL FOR PNEUMATIC TIRES
Franz Ischinger, Katharinenberg, Georg Behrmann, Katzwang, and Karl Linzenkirchner, Ingolstadt, Germany, assignors to Zweirad-Union AG, Nurnberg, Germany, a corporation of Germany
Filed Feb. 23, 1965, Ser. No. 434,419
Claims priority, application Germany, Feb. 29, 1964, Z 10,677
4 Claims. (Cl. 152—397)

Our present invention relates to an improved wheel structure for pneumatic tires and, more particularly, to a wheel assembly for so-called over-wide tires utilizing reduced air pressure. Tires of the latter type have a generally flattened configuration with a broader tread face in contact with the ground by contrast with the more or less circular cross-section of conventional regular-pressure and low-pressure tires.

Wheels for rubber tires of the later type, particularly those suitable for use in automotive vehicles, have been proposed heretofore and, in the usual manner have had their beads held against the round ledges of the rim. Because of the relatively low pressure to which such tires are subjected, it has been proposed to utilize a pair of interfitting drumlike wheel members adapted to form the outer rim seat for one bead and an inner rim seat or compression member for the other bead, each bead being thus held between an inner compression member and an outer rim seat. The frustoconical or pot-shaped rim members of this construction required relatively small dimensional tolerances to enable a tight fit to be maintained at both beads, particularly when tubeless tires were involved. In practice, however, it was found that the interfitting members of the wheel had dimensional differences ranging up to 3 mm. and were unable to properly retain overwide tires at pressures so low as to practically preclude the pneumatic retention of the bead in place; as previously observed, the unavoidable dimensional differences prevented the maintaining of a seal when tubeless tires were employed. It may also be noted that various beadlocks, bead clips and divided rims have been provided heretofore for retaining the beads of pneumatic tires, even when pneumatic pressure fails. A beadlock, for example, could be wedged between the inner faces of the beads of a tire to hold them against the round legs of the rim, while a bead clip may be provided to prevent each bead from moving away from the respective ledges of the rim and can thus engage such ledges. When divided rims are empolyed, it is common practice to use a "flat-base" or semi-drop-center rim, one of whose rim ledges is removably mounted upon the wheel to enable the tire to be axially withdrawn therefrom or forced onto the base of the rim. The bead is held against these removable rim ledges via pneumatic pressure. Systems of the latter type have not found widespread acceptance for over-wide or wide-tread tires operating at low pressures because of their inability to maintain a seal about both beads and provide the mechanical support necessary to prevent the inadvertent withdrawal of the bead of a tire from engagement with a rim ledge.

It is the principal object of the present invention, therefore, to provide an improved wheel structure for pneumatic tires in which the aforementioned disadvantages are avoided and which enable a reduced-pressure, wide-tread tire to be positively retained in place.

A more specific object of this invention is to provide an improved wheel structure for reduced-pressure wide-tread tires which will permit tubeless operation thereof without the danger of tire autodeflation as a result of the insufficiency of pneumatic forces normally holding the tire in sealing relationship with the wheel.

These and other objects of the present invention which will become apparent hereinafter are attained in accordance with the present invention by a wheel structure in which the disk wheel or wire wheels is provided with an annular base provided with a pair of annular inner sealing surfaces engageable with inner faces of the beads of a pneumatic tire, and a pair of annular clamping rims connectable to the base and engageable with the outer surfaces of the beads via flanged rim ledges. Thus, in contradistinction to conventional divided rims having only one removable rim member engageable with the outer face of a bead of the tire, the present invention provides for a pair of clamping members each of which is of annular configuration and is provided with an outwardly extending flange in all-round clamping engagement with the outer face of a respective bead, these annular clamping members holding the inner faces of these beads in all-around engagement with a preferably rolled and reinforced flange or ledge of the wheel base. The term "base" is employed herein to designate that portion of the wheel structure bridging the beads of the tire and generally serving as the terminus for the spoke wires or the support disk of the wheel. It is preferred, in accordance with the present invention, to construct the wheel as a disk wheel in which the base is formed by joining a pair of pot-shaped or generally frustoconical wheel members in back-to-back relationship so that their coextensive central portions can be welded together to form a wheel-support disk having double thickness. The outwardly turned bead-engaging ledges of the base can be reinforced by rolling them back, as previously described, thereby providing a more or less rounded or smooth surface engageable with the inner faces of the bead.

According to another feature of the present invention, the base of the wheel is formed with a surface extending generally parallel to the wheel axis and thus of substantially cylindrical configuration in the region of the bead-engaging flanges of the clamping portion and base of the wheel along each bead. These complementary cylindrical surfaces upon the base portion and each clamping portion serve to center the clamping portions and insure uniform engagement of each bead. The clamping means can include bolts, studs or other means for drawing the clamping portions and the base portion together in axial direction, these bolts being disposed in a portion of the base or clamping ring extending inwardly from any transversely to the aforedescribed cylindrical portions. Moreover, cushioning means can be provided between each clamping portion and the base portion, according to the present invention, for compression upon tightening of the bolts. The resilient means can include an annular strip of rubber or a resiliently compressible synthetic resin sandwiched between a generally cylindrical portion of the clamping members, inwardly of the bolts, and an outwardly divergent frustoconical portion of the base of the wheel. Foam rubber and foamed synthetic resins are suitable resilient layers according to this invention.

The above and other objects, features and advantages of the present invention will become more readily apparent from the following description reference being made to the accompanying drawing in which:

FIG. 1 is an axial cross-sectional view through a wheel structure, according to this invention, with the tire omitted;

FIG. 2 is an enlarged detail view of the clamping means holding the bead of a tire to the base of the wheel; and FIG. 3 is a side-elevational view of the wheel assembly drawn to a reduced scale.

In the drawing, we show a wheel structure wherein two frustoconical and pot-shaped portions 1 and 2, produced by drawing or forging from steel, are welded together with their disk portions 1' and 2' in back-to-back relationship by the hermetic or gas-tight weld 3. In addition, the disk portions 1' and 2' can be spot- or seam-welded at 3a and 3b on opposite sides of bulges 1" and 2" forming an annular reinforcing tube in the disk portion of the wheel. The hub 5 of the automotive vehicle is provided with studs or bolts 6 in angularly equispaced relationship in the usual manner, the nuts 6' holding wheel W in place. The openings 1a in the plate 1' are formed along a bulge while the openings 2a, aligned therewith, are in surface contact with the hub 5. As the nuts 6' are tightened, a slight compression of the bulge can be effected so that the wheel is retained in place with a resilient force. Centering is effected via the conical surface 6" of the nuts 6' in the usual manner. The base portions 1 and 2 of the wheel W are formed with inwardly turned and outwardly extending flange ledges 7 and 8 which, when a tire 11 is in position, engage the inner faces 10' of the beads 10 with all-around contact. The beads 10 of the underside and reduced-pressure tire 11 are clamped against these reinforced ledges 7 and 8 by annular clamping members 12 and 13 whose outwardly extending flanges 15 engage the outer surfaces 10" of the respective beads. The clamping rings 12 and 13 are formed with generally cylindrical portions 9 which slidingly engage corresponding portions 14 of the wheel base 1, 2 and terminate at the engagement edges 7 and 8. The complementary surfaces 9, 14 center the rings 12 and 13 with respect to the wheel base. It will be apparent that even if the base and clamping rings are a poor match with respect to their dimensions, the seal between the base and the beads 10 of the tire does not lose effectiveness since the edges 7, 8 are held in constant all-around engagement with the inner faces of these beads. The clamping means further includes a plurality of angularly spaced bolts 16 whose enlarged heads 16' can be hermetically welded to a wall portion 19 of the semi-drop-center rims so that the interior or well thereof does not communicate with the atmosphere except via a conventional tire valve (not shown). The wall portion 19 extends generally transversely of the cylindrical portions 9, 14 and is generally parallel to a similar wall portion 20 of each clamping rim 12, 13. Nuts 17 draw the clamping rings 12 and 13 inwardly to hold the bead in place. In the event the bolt head 16' does not sealingly engage the wheel base, a sealing washer 21 can be provided for each bolt 16, in which case it is desirable to constitute a layer 18 as an annular sealing means for the assembly inwardly of the bolts 16. Even when an additional sealing means is not required, it has been found particularly advantageous to provide the resilient (e.g. of foam rubber or synthetic resin) layer 18 between a generally cylindrical surface 22 of the stepped clamping ring 12 and an outwardly divergent frustoconical surface 23 of each base portion 1, 2. Thus, when the nuts 17 are tightened, the rings are drawn axially toward one another to clamp the beads 10 against rounded edges 7, 8 while comprising the resilient cushioning layers 18.

The invention described and illustrated is believed to admit of many modifications within the ability of persons skilled in the art, all such modifications being considered within the spirit and scope of the appended claims.

We claim:

1. A vehicle-wheel assembly, comprising:

a pair of generally frustoconical pot-shaped base portions rigidly interconnected to form an annular drop-center wheel base surrounding an axis and a support disk for said base extending perpendicularly to said axis while provided with means for securing said wheel base to the hub of a vehicle, said drop-center wheel base being provided with a pair of outwardly extending annular ledges along axially spaced rims of said base, respective first generally cylindrical surfaces inwardly of said ledges and coaxial therewith, respective first transverse wall portions extending generally transverse to said axis inwardly of said first cylindrical surfaces, and respective frustoconical wall portions diverging from said disk toward said first transverse surfaces and merging therewith;

a reduced-pressure, wide-tread pneumatic tire having a pair of annular beads with respective inner faces each in engagement with an axially outer face of a respective ledge;

a pair of clamping rings substantially coaxial with said wheel base and each having a respective outwardly extending annular flange engageable with a corresponding outer face of a respective bead for resiliently holding it in all-around engagement with a corresponding ledge, said rings each having a respective second generally cylindrical surface coaxial with the respective one of said flanges and received within the corresponding first cylindrical surface of said wheel base while being slidably engageable therewith for centering said rings on said base, and a respective second transverse wall portion extending inwardly from the corresponding second cylindrical surface generally parallel to the corresponding transverse wall portion of said wheel base; and means spanning the corresponding first and second transverse wall portions of said wheel base and said rings, respectively, for removably securing said clamping rings to said wheel base.

2. A vehicle-wheel assembly, comprising:

a pair of generally frustoconical pot-shaped base portions rigidly interconnected to form an annular drop-center wheel base surrounding an axis and a support disk for said base extending perpendicularly to said axis while provided with means for securing said wheel base to the hub of a vehicle, said drop-center wheel base being provided with a pair of outwardly extending annular ledges along axially spaced rims of said base, respective first generally cylindrical surfaces inwardly of said ledges and coaxial therewith, respective first transverse wall portions extending generally transverse to said axis inwardly of said first cylindrical surfaces, and respective frustoconical wall portions diverging from said disk toward said first transverse surfaces and merging therewith;

a reduced-pressure, wide-tread pneumatic tire having a pair of annular beads with respective inner faces each in engagement with an axially outer face of a respective ledge;

a pair of clamping rings substantially coaxial with said wheel base and each having a respective outwardly extending annular flange engageable with a corresponding outer face of a respective bead for resiliently holding it in all-around engagement with a corresponding ledge, said rings each having a respective second generally cylindrical surface coaxial with the respective one of said flanges and received within the corresponding first cylindrical surface of said wheel base while being slidably engageable therewith for centering said rings on said base, and a respective second transverse wall portion extending inwardly from the corresponding second cylindrical surface generally parallel to the corresponding transverse wall portion of said wheel base;

means spanning the corresponding first and second transverse wall portions of said wheel base and said rings, respectively, for removably securing said clamping rings to said wheel base;

and a resiliently compressible layer interposed between the respective frustoconical wall portion of said wheel base and each of said clamping rings outwardly of the means for removably securing said clamping rings to said wheel base.

3. An assembly as defined in claim 2 wherein said rings are each provided with a further cylindrical wall portion inwardly of said second transverse portions and received within the frustoconical wall portions of said base, said layer being disposed along said further cylindrical wall portions for wedging engagement with said frustoconical wall portions.

4. An assembly as defined in claim 2 wherein said means for removably securing said clamping rings to said wheel base includes a plurality of angularly spaced bolts extending axially outwardly from said transverse wall portions of said wheel base, the transverse wall portions of said rings being provided with holes adapted to receive said bolts whereby nuts threaded onto said bolts draw said rings axially against said beads.

References Cited by the Examiner
UNITED STATES PATENTS

| | | | |
|---|---|---|---|
| 1,842,219 | 1/1932 | Trautman | 152—398 X |
| 2,344,362 | 3/1944 | McNulty | 152—398 |
| 2,576,736 | 11/1951 | Watkins | 152—397 |

ARTHUR L. LA POINT, *Primary Examiner.*

C. W. HAEFELE, *Assistant Examiner.*

Dedication 3,283,800.—*Franz Ischinger*, Katharinenberg, *Georg Behrmann*, Katzwang, and *Karl Linzenkirchner*, Ingolstadt, Germany. WHEEL FOR PNEUMATIC TIRES. Patent dated Nov. 8, 1966. Dedication filed Nov. 29, 1972, by the assignee, *Zweirad Union AG*.

Hereby dedicates to the Public the portion of the term of the patent subsequent to Nov. 8, 1983.

[*Official Gazette February 20, 1973.*]

Corrected Dedication 3,283,800.—*Franz Ischinger*, Katharinenberg, *Georg Behrmann*, Katzwang, and *Karl Linzenkirchner*, Ingolstadt, Germany. WHEEL FOR PNEUMATIC TIRES. Patent dated Nov. 8, 1966. Dedication filed Nov. 29, 1972, by the assignee, *Zweirad Union AG*.

Hereby dedicates to the Public the portion of the term of the patent subsequent to Nov. 14, 1972.

[*Official Gazette May 8, 1973.*]